April 11, 1933.　　　　　A. GRECO　　　　　1,903,451
PROTECTIVE SYSTEM FOR ELECTRIC CURRENT RECTIFIERS
Filed Dec. 3, 1929　　　　2 Sheets-Sheet 1
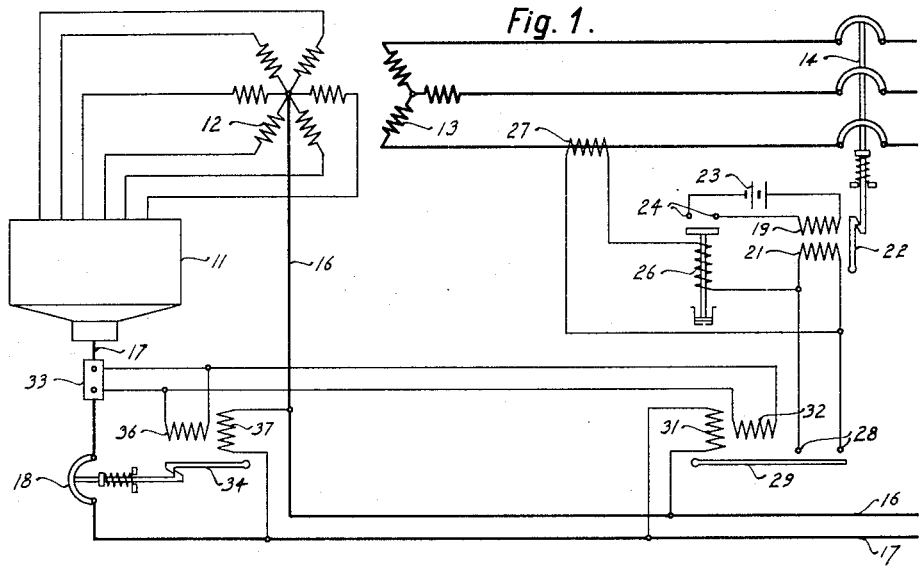
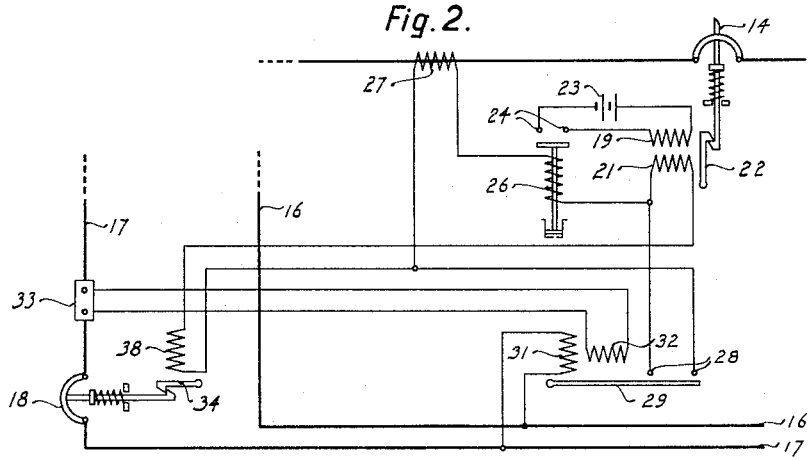
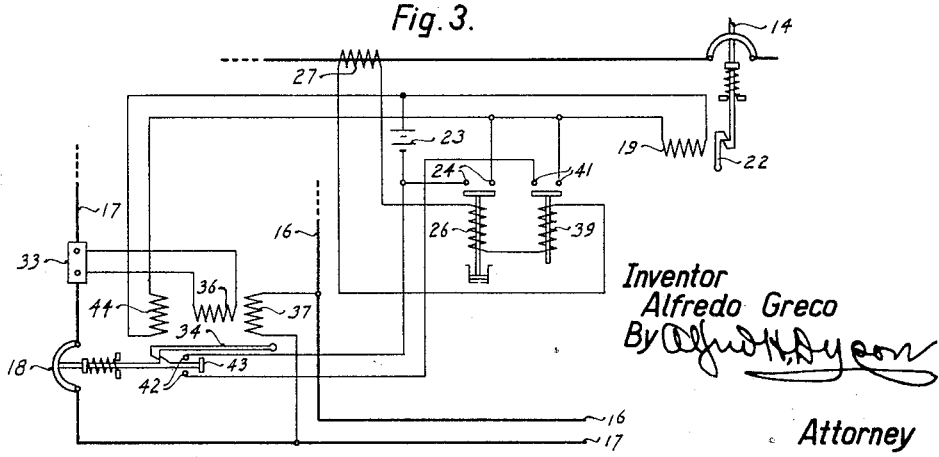
Inventor
Alfredo Greco
By
　　　Attorney April 11, 1933.  A. GRECO  1,903,451
PROTECTIVE SYSTEM FOR ELECTRIC CURRENT RECTIFIERS
Filed Dec. 3, 1929   2 Sheets-Sheet 2
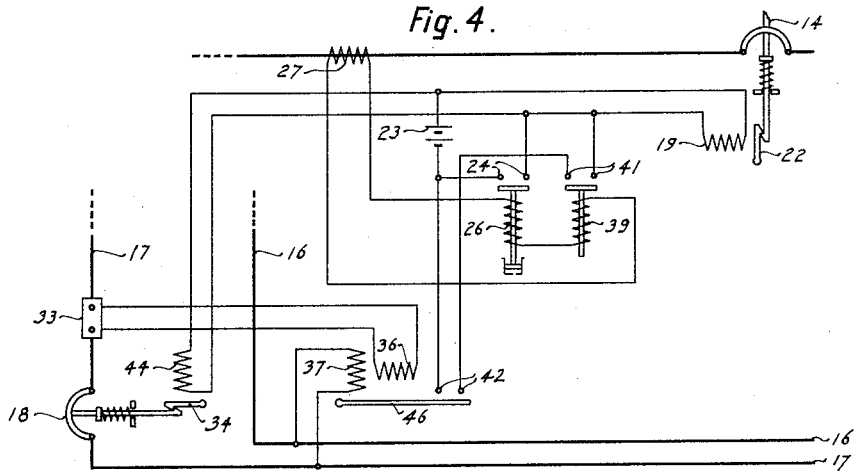
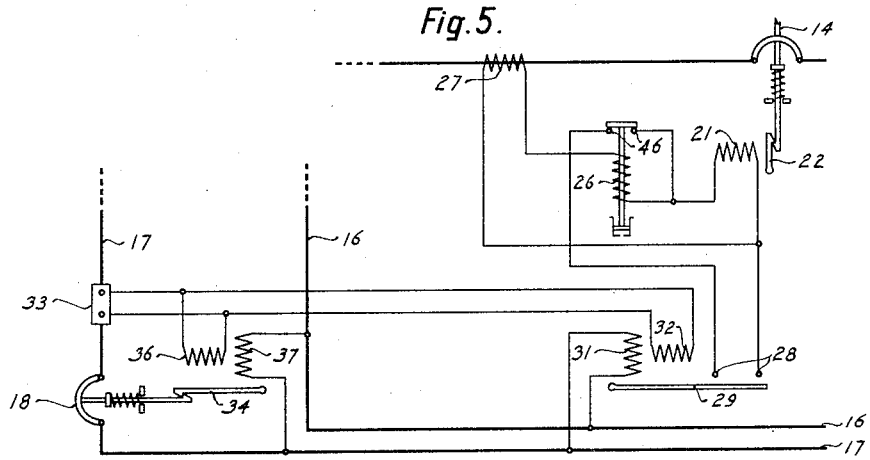
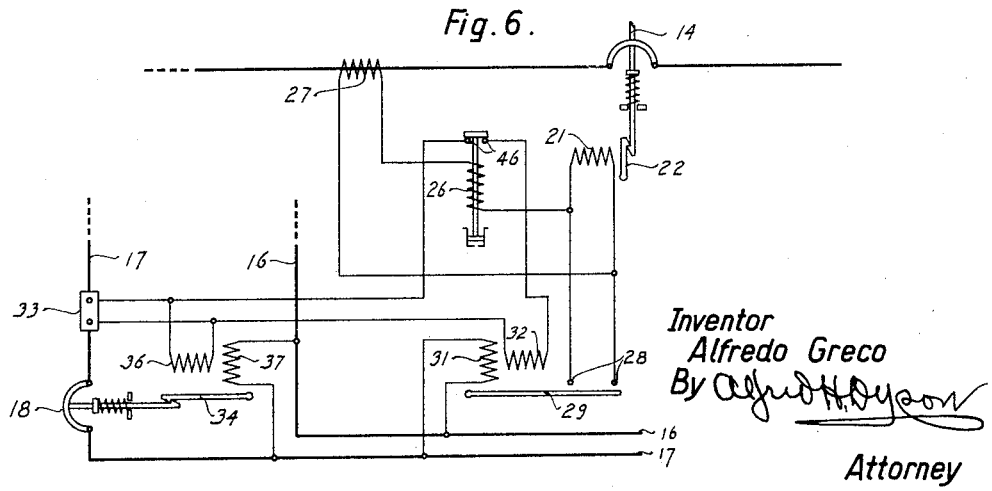
Inventor
Alfredo Greco
By *Alfred H. Dyson*
Attorney Patented Apr. 11, 1933

1,903,451

UNITED STATES PATENT OFFICE

ALFREDO GRECO, OF ZURICH, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

PROTECTIVE SYSTEM FOR ELECTRIC CURRENT RECTIFIERS

Application filed December 3, 1929, Serial No. 411,380, and in Germany December 3, 1928.

This invention relates to improvements in protective systems for electric current rectifiers and, more particularly, to such systems as operate selectively thereon tending to maintain substantially constant operation of the rectifier.

To maintain electric current rectifiers in substantially constant operation, it is necessary to guard against and provide for protection of the system under conditions of short circuits in the direct current or output line, of backfires in one of a number of parallel-operating rectifier units and of backfires in a single rectifier unit. The same protective system may be used for a single unit and for a number of parallel units if such system be properly selective in its operation.

Heretofore, rectifier systems were equipped with a circuit breaker operated by a damped maximum-current-operated relay on the alternating current side and were provided with a circuit breaker operated by a quick-acting reverse current relay on the direct current side of the rectifier. Such systems are, however, dependent on a reverse flow of current on the direct current side, which reverse current may not be present under all conditions. In case of backfire in a rectifier unit operating alone, the quick-acting reverse current relay on the direct current side is not operated, and the backfire can be quenched only by operation of the time-delay-operated circuit breaker on the alternating current side. A backfire continuing for any length of time may result in very serious damage to the rectifier electrodes, and may even amount to such damage as to require replacement of the electrodes or, at least, reconstruction thereof.

It is, accordingly, among the objects of the present invention to provide a system for protecting a rectifier installation from damage by either a direct current line short-circuit, or from a backfire within any one of the rectifiers itself.

Another object of the invention is to provide a protective system for rectifier installations in which the several protective devices will operate selectively in dependence on the abnormal actuating conditions.

A further object of the invention is to provide a protective system for rectifier installation in which the rectifier unit affected will be quickly cut-out of operation in case of a backfire therein, thereby avoiding all possibility of damage to the rectifier structure.

Objects and advantages, other than those above set forth, will be apparent from the following description and the drawings, in which Figure 1 schematically shows one embodiment of the invention utilizing a reverse current relay on the direct current side with quick-acting and time-delay circuit-breaker-actuating means on the alternating current side, Fig. 2 diagrammatically shows a modification of the embodiment shown in Fig. 1, in which a reverse-current-circuit-breaker-operating device on the direct current side of the rectifier is connected with the circuit-breaker-operating device on the alternating current side thereof, Fig. 3 diagrammatically shows an embodiment of the invention similar to that above referred to, with addition of a reverse-current-circuit-breaker-operating device on the direct current side, Fig. 4 diagrammatically shows a modification in which both the alternating current and the direct current circuit breakers may be operated simultaneously, Fig. 5 shows a modification of the present invention in which a reverse-current-actuated device is utilized for operating the circuit breaker on the direct current side of the rectifier, and a forward current device, together with a time-delay relay, is utilized for operating the circuit breaker on the alternating current side of the rectifier, and Fig. 6 shows a modification of the system referred to in Fig. 5, wherein the time-delay device operates in a circuit of low current rather than in a circuit of high current, as described with respect to Fig. 5.

Referring to the drawings more particularly by reference characters, the reference numeral 11 indicates an electric current rectifier of the well known metallic vapor type, the anodes of which are connected with a secondary winding 12, forming, with a primary winding 13, a supply transformer for the rectifier. The transformer 12, 13 is connected with a source of alternating current (not shown) by means of a circuit breaker 14. The direct current line of the installation includes the line 16 connected, as is usual, with the neutral point of the transformer secondary 12, and the line 17 from the cathode of the rectifier. The direct current line 16, 17 is provided with a circuit breaker 18 whereby this line may be opened to disconnect the rectifier from the output circuit.

The circuit breaker 14 is provided with a releasing or opening device comprising coils 19 and 21, acting, when energized, on a common armature-latch 22 which normally retains the circuit breaker 14 in closed position. The coil 19 is arranged to be energized from the current source 23 upon closing of a pair of contacts 24 by a damped relay 26. The coil of the relay 26 is energized to the operating point, from a current transformer 27, upon the short-circuiting of coil 21 by the bridging of the contacts 28 by an armature 29 which is common to coils 31 and 32. The coil 31 which is connected across the direct current line 16, 17, is merely a polarizing coil for the armature 29, and may be omitted if the armature 29 is in the form of a permanent magnet. The coil 32, which is connected with a shunt 33 in the direct current line 17, is so constructed that it will attract the armature 29 only upon the flow of excessive forward current through this line.

The direct current circuit breaker 18 is provided with a releasing device comprising an armature-latch 34 which normally retains the breaker 18 in the closed position. This armature is arranged to be actuated by a coil 36 connected with the shunt 33 in the direct current line 17 and so constructed that the armature 34 will be attracted thereby only when a reverse current flows through the coil. A coil 37 connected across the direct current line 16, 17 is arranged adjacent the armature-latch 34 for the purpose of polarizing the same, and may be omitted if the armature-latch 34 is formed, as a permanent magnet.

In normal operation, the positions of the several movable portions of the system are as shown in the drawings, but when a short-circuit occurs in the direct current line 16, 17 the coil 32 will be influenced by the excessive forward current and will attract the armature 29, thereby closing contacts 28. The short-circuiting of coil 21 in this manner, will increase, to the operating point, the energization of the coil of the damped relay 26 which, after the predetermined set time, will close contacts 24, thereby causing energization of coil 19 which attracts armature-latch 22 to release circuit breaker 14. Coil 21, being short-circuited by armature 29, is not energized by the above action. If a backfire occurs in a single rectifier unit, coil 21 will immediately receive current from the transformer 27, due to the fact that contacts 28 remain open, and will release circuit breaker 14 by attracting armature-latch 22. The coil of relay 26 will also be energized to close the circuit of coil 19, which will add its attractive force to that of coil 21 which has, however, already acted to cause opening of the circuit breaker 14. When a plurality of rectifier units are installed to operate in parallel, occurrence of a backfire in one unit forms a direct short-circuit on all of the other units. Under such conditions, a reverse current will flow through the direct current line 16, 17 and energize coil 36, which then attracts armature-latch 34 to permit the circuit breaker 18 to open. Coil 21 will likewise be energized by current from the transformer 27 to attract armature-latch 22, thereby permitting opening of circuit breaker 14 so that the affected rectifier unit is cut out of the installation of parallel-operating units on both the alternating current and direct current sides.

The embodiment shown in Fig. 2 is similar to that shown in Fig. 1, with the exception that instead of providing a reverse-current-operated device for the purpose of opening the direct current circuit breaker 18, a releasing coil 38, connected in series with the releasing coil 21, is arranged to attract the armature-latch 34 of the circuit breaker 18. The further protective action of the system is, in general, the same as above described with respect to Fig. 1.

In the modification shown in Fig. 3, the alternating current circuit breaker 14 is provided with only the coil 19 and a quick-acting relay 39, connected in series with the damped relay 26. The relay 39 controls a pair of contacts 41 forming a portion of a circuit which also contains contacts 42. A releasing coil 44, connected in series with coil 19, will permit release of the circuit breaker 18 simultaneously with release of the circuit breaker 14 by the coil 19. When the direct current line short-circuit occurs, quick-acting relay 39 closes contacts 41 under the action of the current received from transformer 27. The damped relay 26 then, after its predetermined time delay, closes contacts 24, thereby permitting a flow of current from the source 23 to the releasing coils 19 and 44, which coils attract the armature-latches 22 and 34, thereby permitting opening of both the alternating current and the direct current circuit breakers 14 and 18. The above action likewise takes place in case a backfire occurs in a single unit rectifier installation. When a backfire occurs in one of several parallel-operating rectifier units, the reverse current coil 36 attracts armature-latch 34, thereby permitting release of circuit breaker 18 which bridges the contacts 42 by means of a contact-making element 43 connected with the circuit breaker structure. Relay 39 closes contacts 41, thereby causing energization of releasing coil 19 to permit opening of the circuit breaker 14 upon opening of breaker 18.

The modification shown in Fig. 4, illustrates a system in which the reverse current coil 36 and the polarizing coil 37 for the armature 46 are so arranged that the armature may close contacts 42. The action of the system here described, in case of a direct current line short-circuit and a backfire in a single unit installation, is the same as above described. In case, however, of a backfire in one of several parallel units, the reverse current coil 36 attracts the armature 46 which bridges the contacts 42 and, at the same time, relay 39 closes the contacts 41, thereby permitting a flow of current from the current source 23 through the releasing coils 19 and 44, which then attract the armature-latches 22 and 34, thereby permitting the circuit breakers 14 and 18 to open simultaneously.

As shown in Fig. 5, the time-delay relay 26 is arranged to open a pair of contacts 46 which aid in controlling the current circuit to the alternating current circuit-breaker-releasing coil 21. When a direct current line short-circuit occurs, the forward line current energizes coil 32 which attracts armature 29, thereby bridging the contacts 28. After the predetermined time, the time-delay relay 26 acts, under the influence of the transformer 27, to open contacts 46, thereby completing the circuit to coil 21 through the coil of the relay 26. The coil 21 attracts the armature-latch 22 which permits the circuit breaker 14 to open. When a backfire occurs in a rectifier operating as a single unit, current will flow from the transformer 27 through the relay 26 to coil 21, which then permits the breaker 14 to open as above set forth. Occurrence of a backfire in one of parallel operating rectifier units causes the reverse current coil 36 to attract armature-latch 34, thereby permitting circuit breaker 18 to open. Transformer 27, at the same time, energizes coil 21, thereby permitting the circuit breaker 14 to open. The affected rectifier unit is thus cut-out of the circuit on both sides so that the backfire is immediately quenched.

The modification shown in Fig. 6 is so arranged that the contacts 46 are in the direct current circuit containing the releasing coil 32, rather than in the alternating current circuit containing the transformer 27, as in Fig. 5. To secure this arrangement, it is desirable to arrange relay 26 to bridge contacts 46 when a direct current line short-circuit occurs. It will, of course, be apparent that relay 26 may also be arranged to open the contacts 46, rather than to close the same, as above stated. The action in the above modification, in case of a backfire in a single unit or in any one of parallel-operating units, is the same as that described with respect to Fig. 5.

It will be apparent that the present invention provides a system in which the several modifications thereof operate on the same principle for selectively protecting rectifier installations from any one of the three above indicated causes of disturbance in such manner as to avoid complicated circuits or the use of expensive apparatus. The invention utilizes elements which have been found highly trustworthy and reliable so that the maximum safety in operation is attained.

It is important to note that in each of the disclosed embodiments of the present invention, there is means responsive selectively to a short-circuit condition in said system and operable upon occurrence of such condition to effect opening of the breaker 14 in the alternating current line, and to a backfire condition in the current rectifying apparatus 11 and operable upon occurrence of such conditions to effect opening of both breakers 14 and 18 substantially instantaneously. In other words, the means referred to automatically makes the selection as to which breaker or breakers are to be opened, and whether or not the breaker or breakers are opened with a time-delay action or substantially instantaneously all in accordance with the nature of the fault; that is, whether it is a short-circuit in the system or a backfire in the current-rectifying apparatus.

Although but a few embodiments of the present invention have been illustrated and described, it will be apparent to those skilled in the art that various modifications and changes may be made therein without departing from the true spirit thereof or from the scope of the appended claims.

The invention claimed is:

1. In a system of the character described, current-rectifying apparatus of the metallic vapor type, an alternating-current supply line therefor, a direct-current supply line, a circuit breaker for placing said apparatus into and out of effective relationship with respect to said alternating current supply line, a circuit breaker for placing said apparatus into and out of effective relationship with respect to said direct-current line; and means responsive selectively to a short-circuit condition in said system and operable upon occurrence of such condition to effect opening of said first-named breaker with a time-delay action, and to a backfire condition in said apparatus and operable upon occurrence of such condition to effect opening of both breakers substantially instantaneously.

2. In a system of the character described, an electric current rectifier of the metallic vapor type subject to the occurrence of short circuits therein, a line for supplying alternating current to said rectifier to be converted thereby into direct current, an output circuit subject to short circuits therein connected with said rectifier to be supplied with direct current therefrom, a circuit breaker operative to establish connection of said line with and disconnection from said rectifier, a plurality of electromagnetic means operable upon actuation thereof to cause said disconnection operation of said circuit breaker, one of said means being actuated responsive to flow of current in said line upon the occurrence of a short circuit in said rectifier to cause substantially instantaneous disconnection operation of said circuit breaker, a time-delay relay connected to be actuated responsive to flow of current in said line upon the occurrence of a short circuit in said circuit to cause actuation of another of said means to effect said disconnection operation of said circuit breaker in dependence upon the time-delay setting of said relay.

3. In a system of the character described, an electric current rectifier of the metallic vapor type subject to the occurrence of short circuits therein, a line for supplying alternating current to said rectifier to be converted thereby into direct current, an output circuit subject to the occurrence of short circuits therein connected with said rectifier to be supplied with direct current therefrom, a circuit breaker operative to establish connection of said line with and disconnection from said rectifier, a plurality of electromagnetic means operable upon actuation thereof to cause said disconnection operation of said circuit breaker, one of said means being actuated responsive to flow of current in said line upon the occurrence of a short circuit in said rectifier to cause substantially instantaneous disconnection operation of said circuit breaker, a time-delay relay connected to be actuated responsive to flow of current in said line upon the occurrence of a short circuit in said circuit to cause actuation of another of said means to effect said disconnection operation of said circuit breaker in dependence upon the time-delay setting of said relay, and means associated with and operated responsive to flow of current in said circuit upon the occurrence of a short circuit therein for preventing said actuation of said one of said means.

4. In a system of the character described, an electric current rectifier of the metallic vapor type subject to the occurrence of short circuits therein, a line for supplying alternating current to said rectifier to be converted thereby into direct current, an output circuit subject to the occurrence of short circuits and the flow of reverse current therein arranged to be connected with said rectifier to be supplied with direct current therefrom, a first circuit breaker operable to establish connection of said line with and disconnection from said rectifier, a second circuit breaker operable to establish connection of said circuit with and disconnection from said rectifier, a plurality of electromagnetic means each operable upon actuation thereof to cause said disconnection operation of the said first circuit breaker, one of said means being actuated responsive to flow of current in said line upon the occurrence of a short circuit in said rectifier to cause substantially instantaneous said disconnection operation of the said first circuit breaker, a time-delay relay connected with and actuated responsive to flow of current in said line upon the occurrence of a short circuit in said circuit to cause actuation of another of said means to effect disconnection operation of the said first circuit breaker in dependence upon the time-delay setting of said relay, electromagnetically actuated means connected with said circuit and operable upon the occurrence of reverse flow of current therein to cause said disconnection operation of the said second circuit breaker, and means associated with and operable responsive to flow of current in said circuit upon the occurrence of a short circuit therein to prevent said actuation of the said one of said means.

5. In a system of the character described, an electric current rectifier of the metallic vapor type subject to the occurrence of short circuits therein, a line for supplying alternating current to said rectifier to be converted thereby into direct current, an output circuit subject to the occurrence of short circuits and reverse flow of current therein arranged to be connected with said rectifier to be supplied with direct current therefrom, a first circuit breaker operable to establish connection of said line and disconnection from said rectifier, a second circuit breaker operable to establish connection of said circuit with and disconnection from said rectifier, electromagnetic means associated with each of said circuit breakers for causing said disconnection operations thereof, a source of current supply for said means, a time-delay relay associated with and actuated responsive to flow of current in said line upon the occurrence of a short circuit in said circuit to establish operative connection of said source with said means to effect disconnection operation of each of said circuit breakers in dependence upon the time-delay setting of said relay, a second relay connected with and actuated responsive to flow of current in said line upon the occurrence of a short circuit in said rectifier, and a third relay connected with and actuated responsive to reverse flow of current in said circuit, the concurrent actuations of the said second and third relays being operable to establish operation connection of said source of current with said means to thereby cause substantially instantaneous said disconnection operation of each of said circuit breakers.

6. In a system of the character described, an electric current rectifier of the metallic vapor type subject to the occurrence of short circuits therein, a line for supplying alternating current to said rectifier to be converted thereby into direct current, an output circuit subject to the occurrence of short circuits and reverse flow of current therein arranged to be connected with said rectifier to be supplied with direct current therefrom, a first circuit breaker operable to establish connection of said line and disconnection from said rectifier, a second circuit breaker operable to establish connection of said circuit with and disconnection from said rectifier, electromagnetic means associated with each of said circuit breakers for causing said disconnection operations thereof, a source of current supply for said means, a time-delay relay associated with and actuated responsive to flow of current in said rectifier upon the occurrence of a short circuit therein and upon the occurrence of a short circuit in said circuit to establish operative connection of said source with said means to thereby effect said disconnection operation of each of said circuit breakers in dependence upon the time-delay setting of said relay, electromagnetic means connected with said circuit and actuated responsive to reverse flow of current therein operable to effect substantially instantaneous said disconnection operation of said second circuit breaker, and a second relay associated with and actuated responsive to flow of current in said line upon the occurrence of a short circuit in said rectifier operative to establish operative connection of said source of current with said means to effect substantially instantaneous said disconnection operation of said first circuit breaker, the last said operative connection of said source of current including switch contacts associated with and actuated to circuit closing position upon movement of said second circuit breaker to said disconnection position.

In testimony whereof I have hereunto subscribed my name this 18th day of November A. D. 1929.

ALFREDO GRECO.